United States Patent [19]

Maheshwari et al.

[11] Patent Number: 5,932,976
[45] Date of Patent: *Aug. 3, 1999

[54] DISCHARGE LAMP DRIVING

[75] Inventors: Ajay Maheshwari, San Ramon, Calif.; Tokushi Yamauchi, Woburn; Kiyoaki Uchihashi, Belmont, both of Mass.

[73] Assignee: Matsushita Electric Works R&D Laboratory, Inc., Woburn, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/783,557

[22] Filed: Jan. 14, 1997

[51] Int. Cl.⁶ ................................................. G05F 1/00
[52] U.S. Cl. .................. 315/291; 315/209 R; 315/307; 315/174; 315/DIG. 5; 315/DIG. 7
[58] Field of Search .............................. 315/291, 209 R, 315/307, 244, 243, 174, 176, DIG. 2, DIG. 5, DIG. 7; 363/17, 56, 132

[56] References Cited

U.S. PATENT DOCUMENTS

| | | | |
|---|---|---|---|
| 3,969,652 | 7/1976 | Herzog | 315/224 |
| 4,734,624 | 3/1988 | Nagase et al. | 315/243 |
| 4,912,374 | 3/1990 | Nagase et al. | 315/244 |
| 4,949,015 | 8/1990 | Nilssen | 315/200 R |
| 5,491,386 | 2/1996 | Eriguchi et al. | 315/209 R |
| 5,517,088 | 5/1996 | Blom | 315/289 |

FOREIGN PATENT DOCUMENTS

| | | |
|---|---|---|
| 8-124687 | 5/1996 | Japan . |
| 94P01476 | 5/1996 | Japan . |

OTHER PUBLICATIONS

Laski, "High–Frequency Ballasting Techniques for High–Intensity Discharge Lamps", Ph.D. Dissertation 1994, Texas A&M University, Abstract.

*Primary Examiner*—Don Wong
*Assistant Examiner*—Haissa Philogene
*Attorney, Agent, or Firm*—Fish & Richardson P.C.

[57] ABSTRACT

A discharge lamp driving circuit includes DC voltage input connections, lamp driving connections, bridge circuitry, and control circuitry. The bridge circuitry is connected to the DC voltage input connections and to the lamp driving connections and includes circuit elements which in one mode of operation deliver a higher frequency AC voltage to the lamp driving connections and in another mode of operation deliver a lower frequency AC voltage to the lamp driving connections. The control circuitry is connected to control the bridge circuitry selectively as either a half-bridge to deliver the higher frequency AC voltage to the lamp driving connections during starting or a full-bridge to deliver only the lower frequency AC operating voltage to the lamp while the lamp is operating normally after starting. A low frequency driver and a high frequency driver are connected to drive the bridge circuitry.

23 Claims, 12 Drawing Sheets

DISCHARGE LAMP DRIVING

BACKGROUND

This invention relates to driving discharge lamps.

High-intensity discharge (HID) lamps, specifically pulse start metal halide discharge (MHD) lamps, place demanding requirements on the ignition pulse. The ignition pulse amplitude specified by the lamp manufacturer is typically high, though it varies between manufacturers. For example, for reliable starting, Philips Lighting specifies a pulse peak 10 greater than 3.3 kV (see FIG. 1). Apart from the peak pulse amplitude, the pulse must be sufficiently wide 12, typically 1.5–2.5 μs.

In electronic ballast, the required ignition pulse is most commonly generated by charging a capacitor and then discharging it into the primary of a pulse transformer. The secondary to primary turns ratio of this transformer is typically greater than 100. A very high voltage is thus generated across the secondary. This voltage is coupled across the lamp to strike the arc. Various other components such as inductors, resistors and capacitors are used to shape the ignition pulse to meet the requirements set forth by the lamp manufacturers. Design of the ignitor circuit is one of the most critical parts in the ballast because it can affect the lamp life. The peak pulse requirements are relatively easy to meet; but the pulse-width requirements cannot be met easily. The high peak value adds stress on the ignitor transformer and requires special insulation and construction. Also, the peak current in the primary circuit can be as high as 15–20 A. U.S. Pat. No. 5,517,088 describes one implementation. The pulse peak and the pulse-width requirements add significant cost to the ignitor circuit.

As seen in FIG. 2, pulse ignition also adds minimum open-circuit voltage (Voc) requirements since the open circuit voltage determines the glow to arc transition. Most lamps are designed to operate on AC voltage/current and this makes the time 14 from application of the ignition pulse to voltage polarity reversal critical. If the polarity reversal occurs too soon after the ignition pulse, the arc may not go completely from glow to arc transition and it may extinguish. The requirement for this minimum time normally implies that the frequency of voltage applied across the lamp during starting must be sufficiently low (20–30 Hz) and must be increased (150–200 Hz) once lamp starts. This requires extra control circuitry.

In a typical pulse ignitor, the lead capacitance degrades the ignitor performance. For this reason the lead lengths are typically kept to a minimum. U.S. Pat. No. 5,517,088 describes an implementation that reduces this effect.

Starting the lamp at high-frequency (>30 kHz) lowers the required peak of the ignition voltage. It is believed that applying a burst of high-frequency pulses for a period of time is equivalent to applying a wide pulse for that time. The fast transition from a peak of one polarity to the peak of opposite polarity makes the peak-to-peak voltage and not the peak voltage the effective ignition voltage. Capacitive discharge currents at high-frequencies within the arc-tube and to nearby ground planes may also play some role in the reduction of the required pulse amplitude. It has been found that the peak pulse requirements are reduced almost by a factor of two at high frequency. Experience has shown that if the peak is kept below 2.5 kV the stress on the ignitor transformer is considerably reduced. Also, the risk of corona breakdown between ballast terminals and within the ignitor transformer is significantly reduced. Corona breakdown becomes an issue when the lamp fails and the ballast continues to apply high voltage pulses to try to start it. To minimize potential problems under such a situation a shutdown circuit is required that shuts down ballast operation after a predetermined time, typically 20 minutes. Since high-frequency starting significantly reduces the peak voltage requirements it makes the system more reliable, and perhaps smaller and cheaper.

In the realm of fluorescent lamps, resonant circuits are popular for operating fluorescent lamps at high frequency. These circuits have significantly reduced the cost and size of electronic fluorescent ballasts. A resonant circuit also allows ease of starting of the lamp since high voltages can be easily generated in an unloaded series-resonant circuit.

HID lamps typically cannot be operated at high-frequency due to acoustic resonance problems. One major lamp manufacturer has a specially tuned high-frequency ballast for their HID lamps. This ballast utilizes a series-resonant circuit that starts the lamp at high-frequency. A new high-frequency technique utilizing white noise modulation is discussed in the latest work done by Laszlo Laski at Texas A&M University, "High-Frequency ballasting Techniques For High-Intensity Discharge Lamps," Ph.D. Dissertation, 1994. This approach also utilizes a series-resonant circuit in the output. This high-frequency technique is very new and there is not enough test data to assure its universal application. Thus, low frequency square wave operation remains a most popular technique for electronic HID ballasts.

As seen in FIG. 3A, a typical electronic HID ballast 30 is a three-stage power processing device. The first stage is a boost power-factor correction (PFC) stage 32. This stage insures that the current drawn by the ballast is in phase with the line voltage 33 and has low distortion. The second stage is a buck power control stage 34. This stage regulates the lamp power and limits the current in the lamp during the warm-up phase. The final stage is a full-bridge inverter 36 that takes the buck regulator's output, which is DC, and converts it to a low-frequency square wave (AC) for the lamp. In addition to these stages there is also a pulse ignitor circuit 38. Some ballasts (see FIG. 3b) combine 39 the buck stage and the output full-bridge inverter. A pulse ignitor 38 is invariably required to ignite the lamp.

U.S. Pat. No. 4,912,374 describes a high-frequency resonant ignition topology in which the power control stage and the inverter stage are combined in a half-bridge/full-bridge topology (FIGS. 5a and 5b). A disadvantage of this scheme is that since the power control (buck) stage is combined with the output inverter, in order to prevent acoustic resonance, the output inductor 20 and the capacitor 22 across the lamp must provide sufficient filtering to keep the high-frequency component of the lamp current to a minimum. Consequently, the value of the capacitor is large, in the order of $\frac{1}{10}$ micro farad. This scheme operates the lamp at high-frequency and low frequency alternatively. When this circuit is operated at high-frequency and the lamp is off, the resonant circuit formed by the inductor and capacitor produces high voltage to ignite the lamp. Because of the large capacitance value and relatively smaller inductor value very large circulating current flows in the circuit. This large circulating current must be supported by all components of the circuit causing high stress on all parts. When the lamp is and operating in the high-frequency mode, the circuit produces high-frequency current in the lamp. During the low-frequency mode, the switching pattern is changed to one that would control the lamp power and limit the lamp current. This scheme calls for increased complexity of the control circuit and the circuit components must be selected carefully.

Another scheme, similar to the one above, is described in Japanese patent 94P01476. Here (FIG. 6) the power control and current limiting function is provided by a preceding buck converter stage. The advantage of this circuit over the ones described in U.S. Pat. No. 4,912,374 is that the value of the capacitor will be much lower and, thus, the circulating currents are not as high. A disadvantage of this scheme is that it needs four high-frequency switches 24, 26, 28, 30 and the high side switches need to be driven by more expensive drivers 21, 23 to achieve efficient drive. The lamp is again operated at high-frequency 25 and low-frequency 27 alternately.

In the above schemes during the time the lamp operates at high-frequency, the current is largely determined by the value of DC bus voltage 31, frequency of operation, and the value of the inductor. The DC bus voltage is normally fixed by other considerations. Frequency can be used to control the current to a certain extent, but since the circuit must operate close to resonance to produce high-voltage, it cannot be used as an effective control. For proper operation, sufficient current must flow through the lamp during high-frequency operation. This implies that the value of inductance must be low. To keep switching losses low, the resonant frequency must be kept low. To keep the resonant frequency from increasing because of lower inductance value, the value of the capacitor must be increased. The overall effect is that the circulating currents increase. To reach a compromise the lamp current during high-frequency operation may be lower than the desired value.

SUMMARY

In general, in one aspect, the invention features a discharge lamp driving circuit which includes DC voltage input connections, lamp driving connections, bridge circuitry, and control circuitry. The bridge circuitry is connected to the DC voltage input connections and to the lamp driving connections and includes circuit elements which in one mode of operation deliver a higher frequency AC voltage to the lamp driving connections and in another mode of operation deliver a lower frequency AC voltage to the lamp driving connections. The control circuitry is connected to control the bridge circuitry selectively as either a half-bridge to deliver the higher frequency AC voltage to the lamp driving connections during starting or a full-bridge to deliver only the lower frequency AC operating voltage to the lamp while the lamp is operating normally after starting.

In general, in another aspect, a low frequency driver and a high frequency driver are connected to drive the bridge circuitry so that in one mode of operation a higher frequency AC voltage is delivered to the lamp driving connections and in another mode of operation a lower frequency AC voltage is delivered to the lamp driving connections.

Implementations of the invention may include one or more of the following features. The bridge circuitry may include four bidirectional conducting portions connected in a bridge configuration. The bridge circuitry may include a resonant circuit having an inductor and a capacitor, the inductor being connected to one of the lamp driving connections. The control circuitry may be connected to sweep the frequency of the AC voltage during starting through a range that includes a resonant frequency of the resonant circuit. The capacitor may also be connected to the one of the lamp driving connections. The capacitor may be connected to a tap of a winding of the inductor. The control circuitry may be connected to drive the bridge circuitry at essentially a resonant frequency of the resonant circuit. The low frequency driver may be connected to drive two of the switches at DC on or DC off during starting, and a high frequency driver may be connected to drive the other two of the switches. The control circuitry may be connected to the low frequency driver to drive one of the two switches (e.g., the lower switch in FIGS. 7A, 7B) at DC during starting.

The one pair of switches may be connected in series across the DC voltage input connections, and the other pair of switches may be connected in series across the DC voltage input connections. The resonant circuit may be connected between the commonly connected ends of the two switches of the one pair and one of the lamp driving connection, and the commonly connected ends of the two switches of the other pair may be connected to the other one of the lamp driving connections. The control circuitry may be connected to control the bridge circuitry to operate in the starting mode only until the lamp is ignited.

The control circuitry may be connected to control the bridge circuitry during starting to repeatedly and alternately stop operation of the bridge circuit and to continue operation in the starting mode. The control circuit may be connected to control the bridge circuit to deliver essentially DC to the lamp immediately after starting.

In general, in another aspect, the invention features driving a discharge lamp by operating a bridge circuit as a half bridge to deliver a higher frequency AC voltage from bridge circuitry to the lamp during starting, and operating the bridge circuit as a full-bridge to deliver only lower frequency AC operating voltage from the bridge circuitry to the lamp during normal operation after starting.

Among the advantages of the invention are one or more of the following. The circuit for igniting HID lamps is simpler. The peak of ignition voltage is reduced by utilizing a high-frequency starting technique. Stress on circuit components due to high circulating current is reduced. Eliminating high-frequency operation of the lamp eliminates the possibility of acoustic resonance even though the circuit operates at high-frequency during starting.

Other advantages and features will become apparent from the following description and from the claims.

DESCRIPTION

In FIG. 2, $V_{oc}$ represents the open circuit voltage, $V_{pk}$ the peak of ignition pulse, and t the time from ignition pulse to voltage polarity reversal.

FIG. 3 shows a block schematic of electronic ballast for an HID lamp. FIG. 3(a) shows the block schematic of a traditional three stage electronic ballast for HID lamp which has a separate pulse ignitor circuit while

Figure 5A:
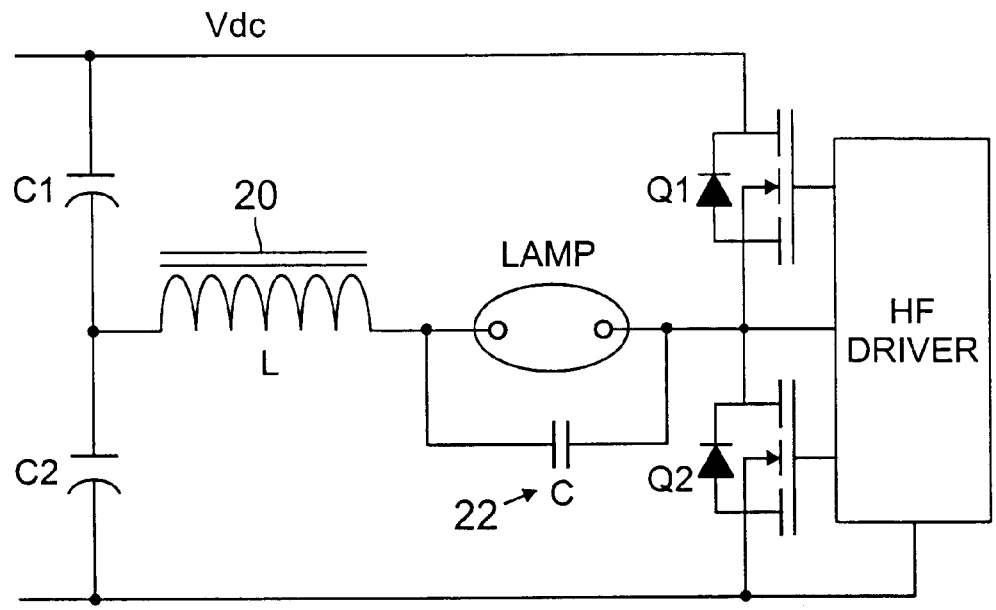
Figure 5B:
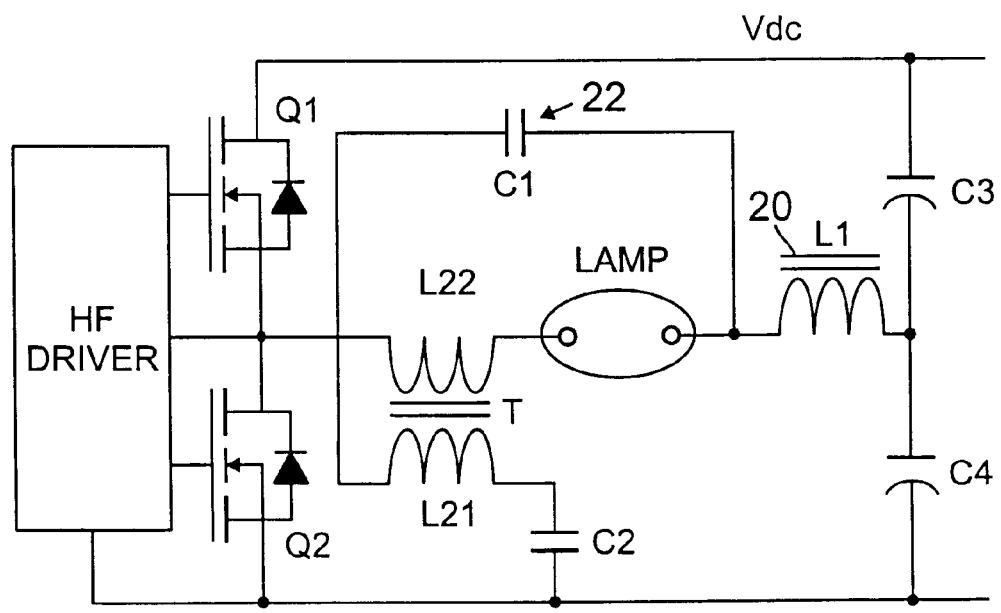

FIGS. 5(a) and 5(b) show two of the embodiments of U.S. Pat. No. 4,912,374.

Figure 6A:
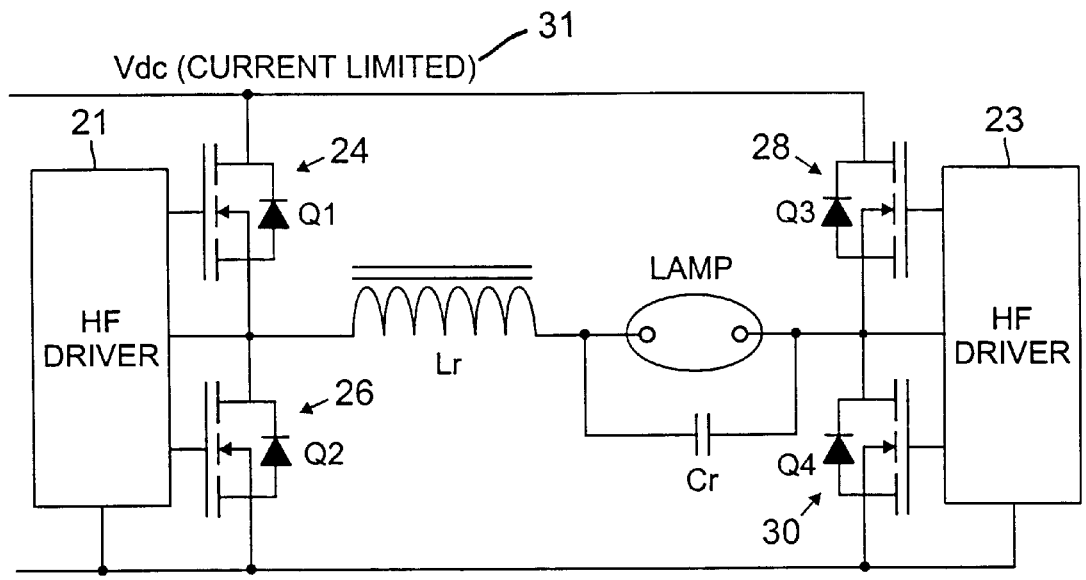
Figure 6B:
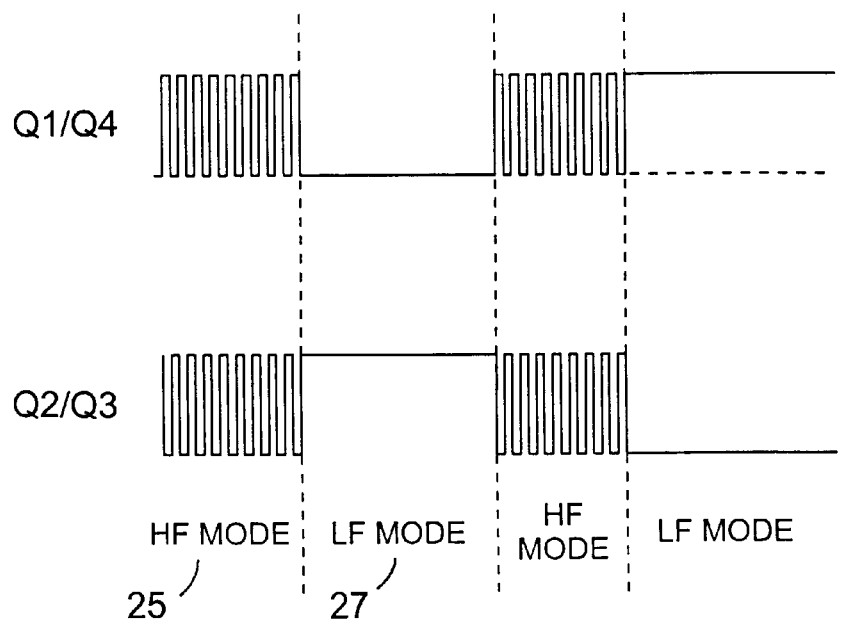

FIG. 6 shows the scheme described in Japanese patent 94P01476.

Figure 7A:
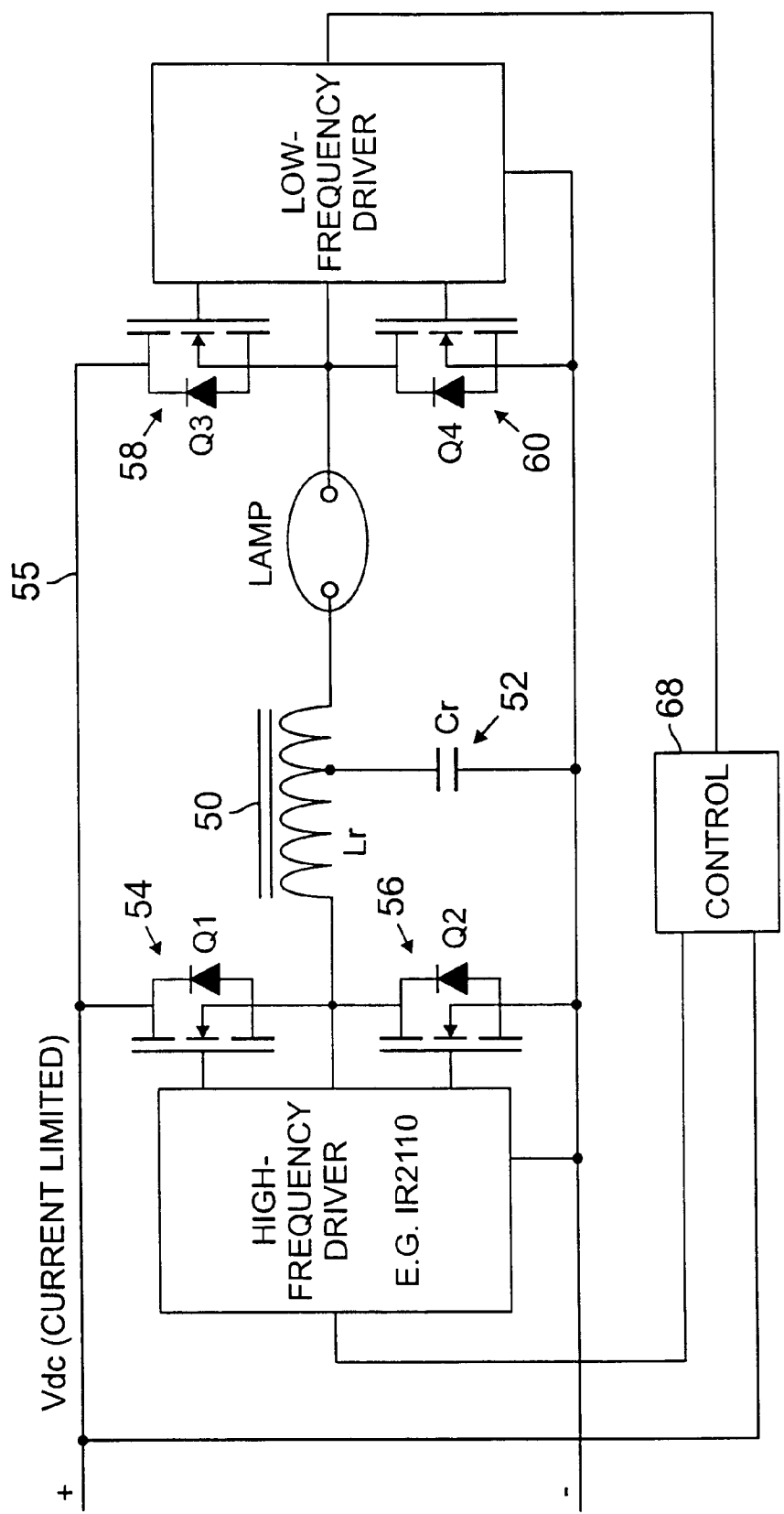
Figure 7B:
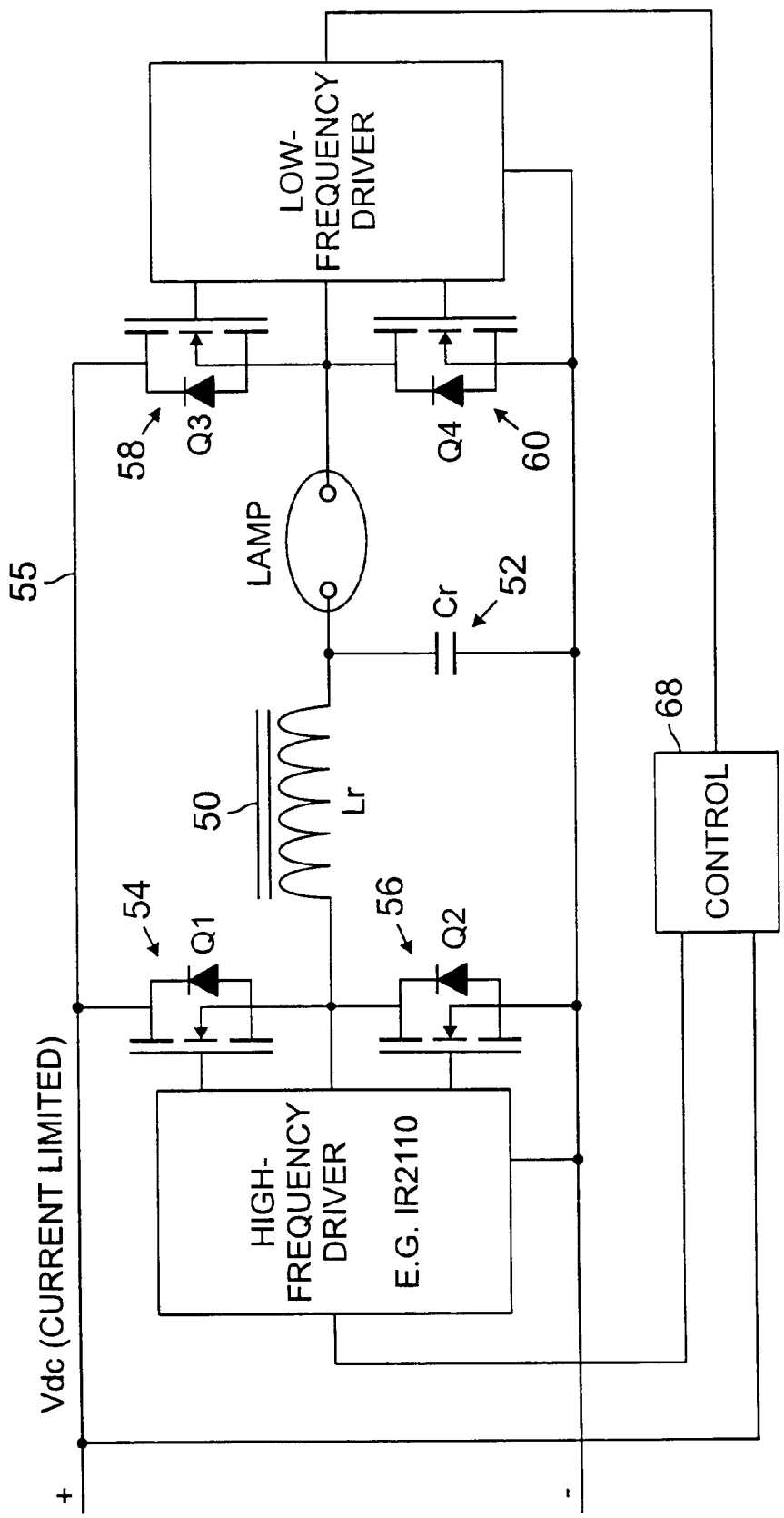

FIG. 7(a) shows a circuit schematic of an embodiment of the invention while FIG. 7(b) shows an alternate arrangement.

Figure 8:
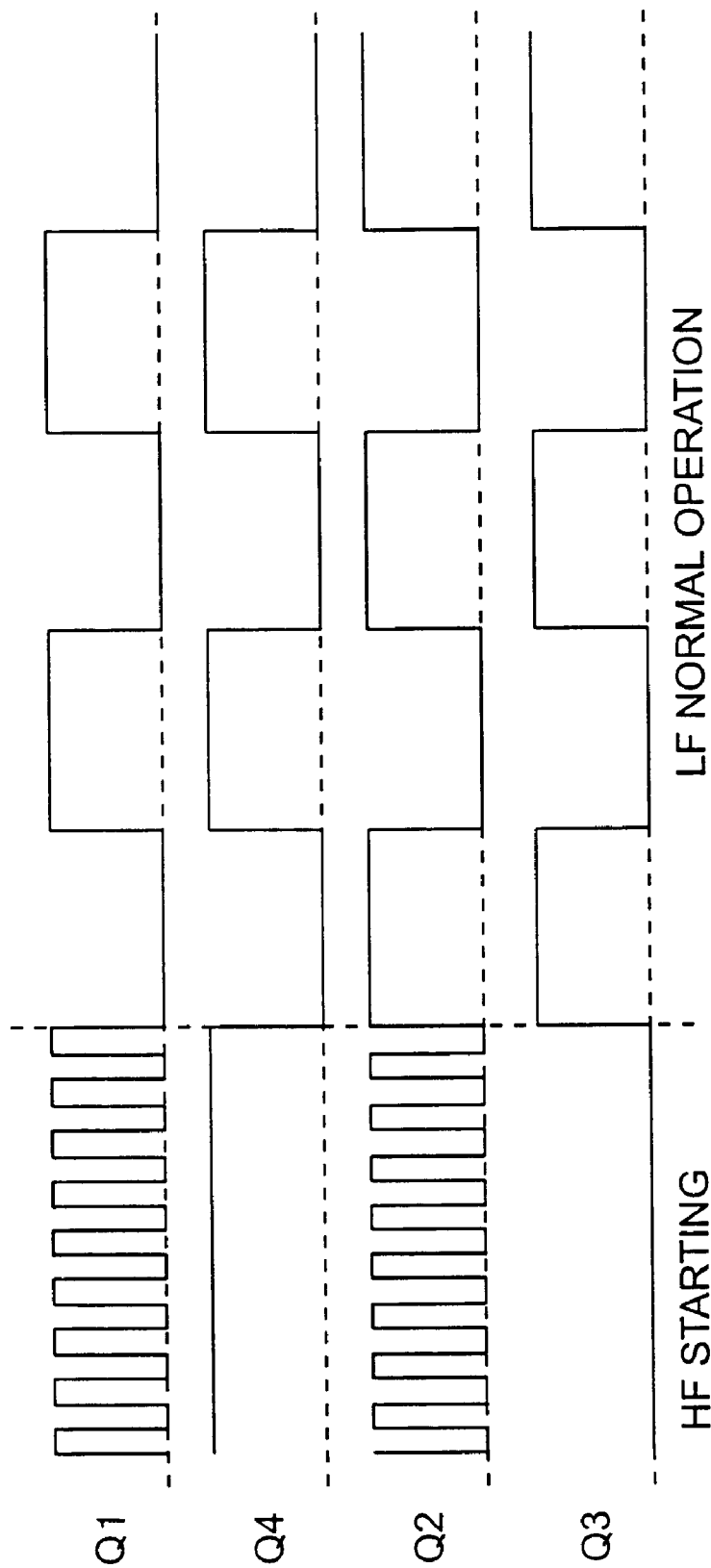

FIG. 8 shows gate drive waveforms during starting and during normal operation (waveforms are exaggerated for clarity).

Figure 9:
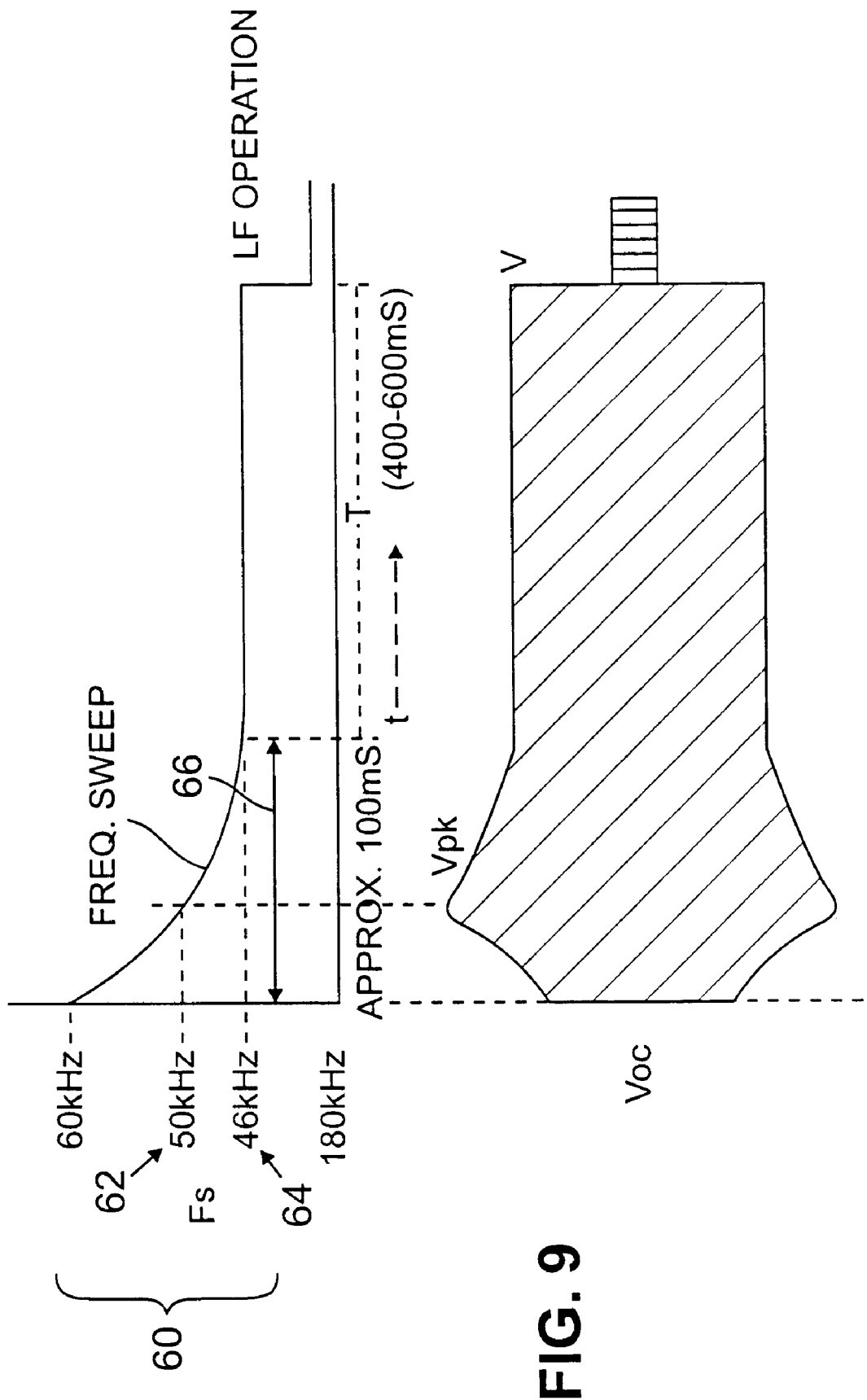

FIG. 9 shows typical operating frequency versus time and the corresponding output voltage versus time.

Figure 10A:
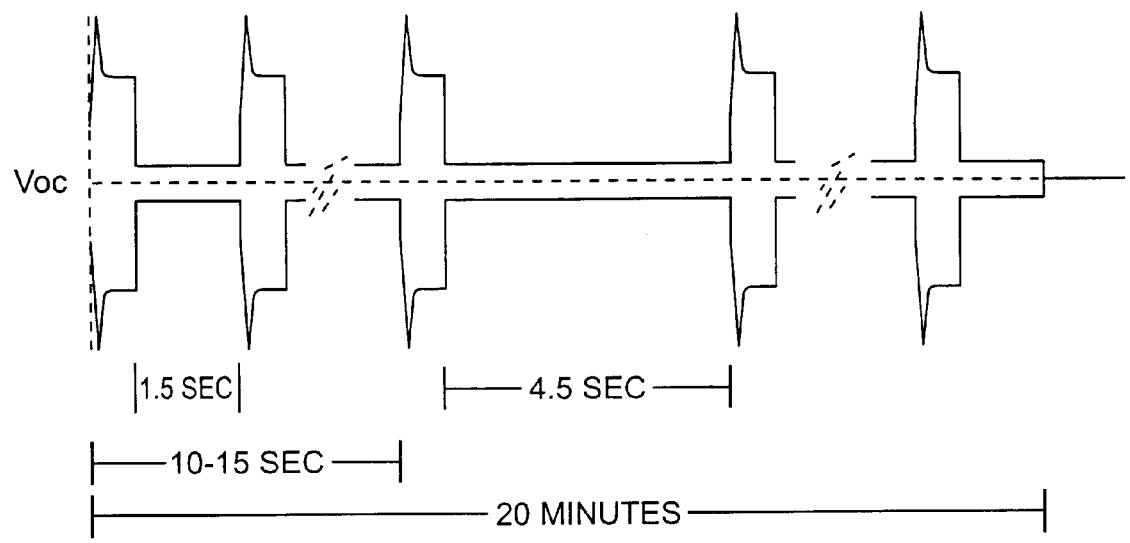
Figure 10B:
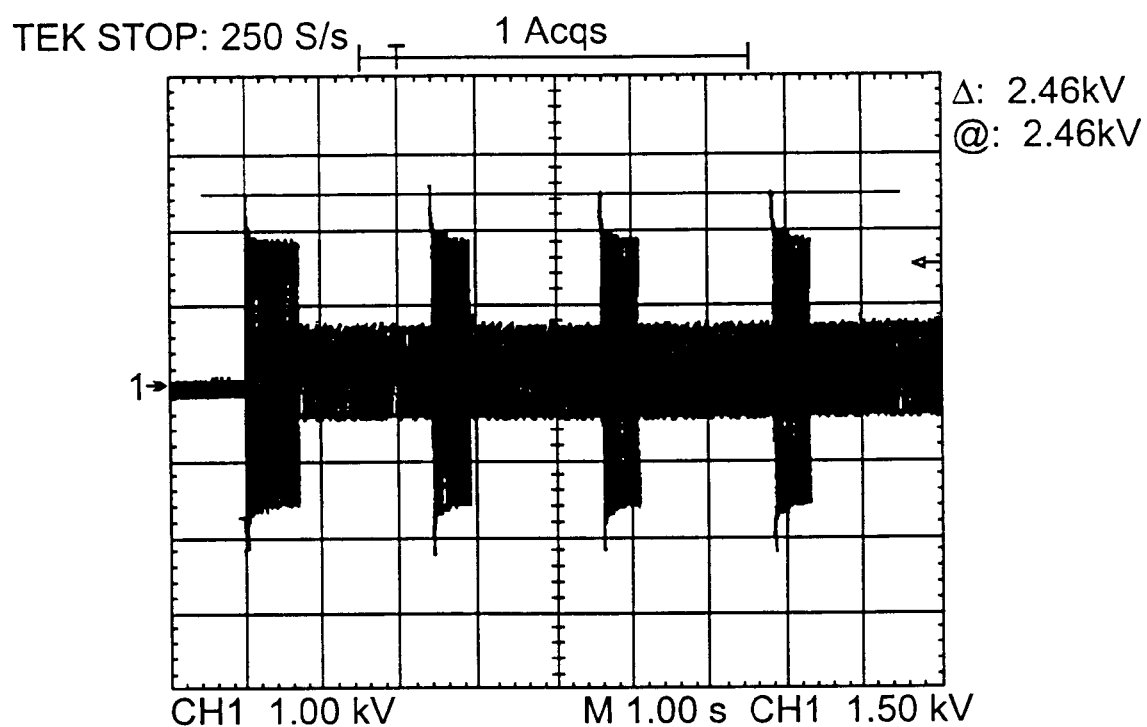

FIG. 10 shows output voltage of the circuit under no-load condition. FIG. 10(a) shows a timing sequence that may be utilized to minimize the stress on parts while FIG. 10(b) shows the actual output voltage at power-up under no-load condition.

Figure 11A:
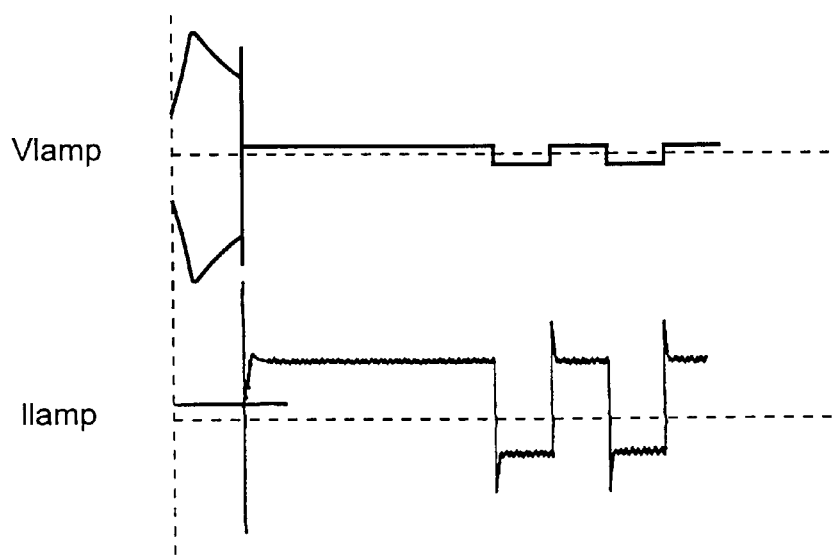
Figure 11B:
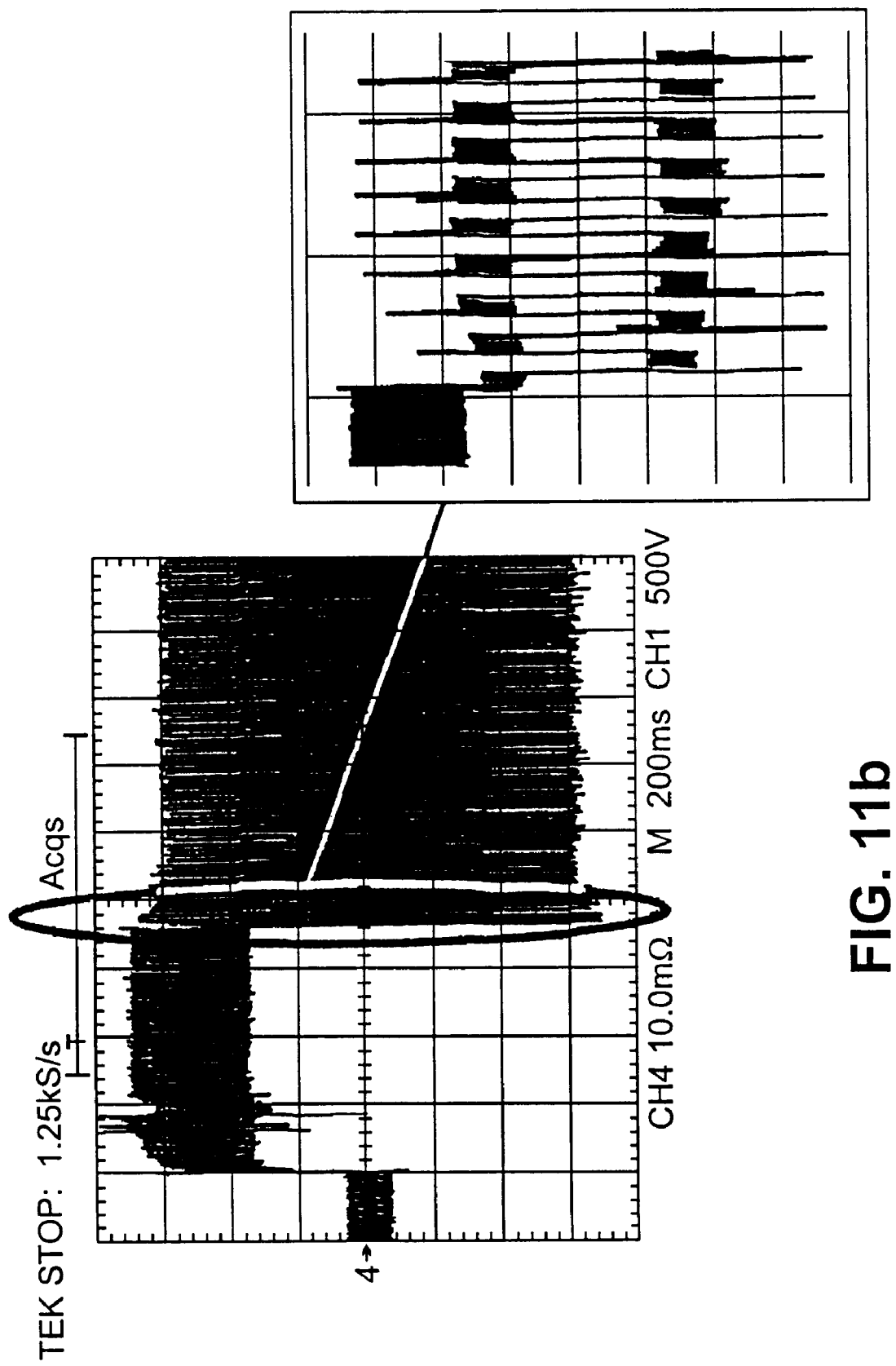

FIG. 11 shows lamp starting characteristic. FIG. 11(a) shows lamp voltage and current relationship at start-up while FIG. 11(b) shows the actual lamp current and its transition form starting mode to normal running mode.

Figure 1:
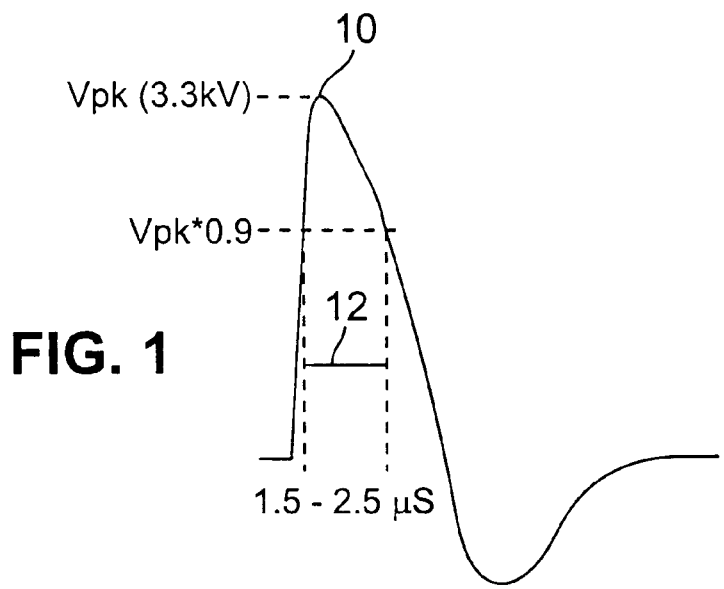
FIG. 1 shows typical requirements of the ignition pulse from a pulse ignitor.
Figure 2:
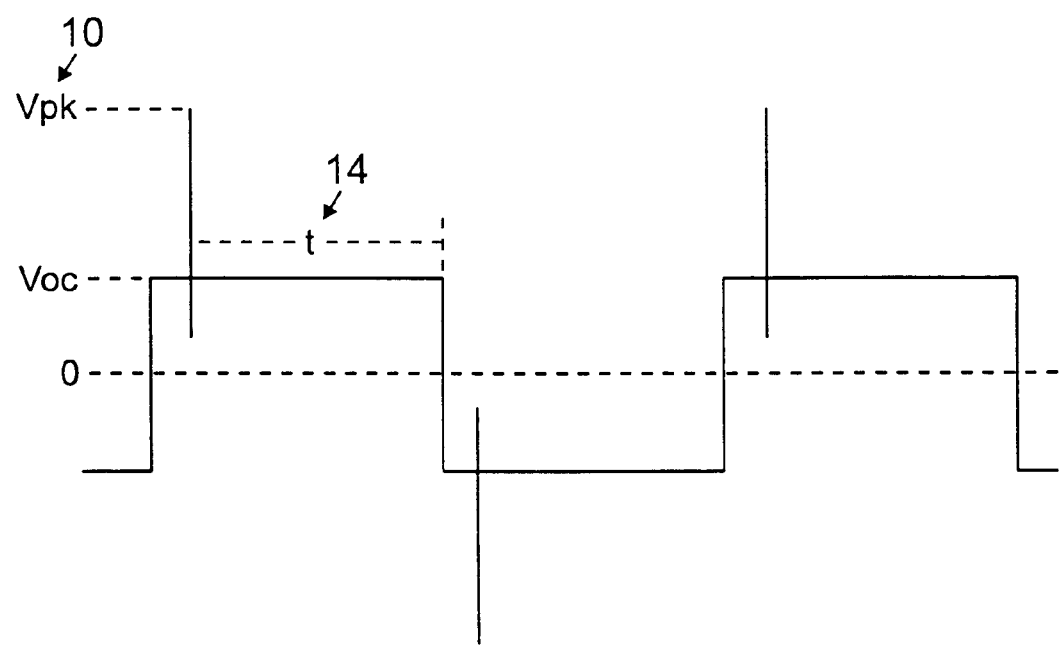
FIG. 2 illustrates the open circuit voltage requirements.
Figure 3A:
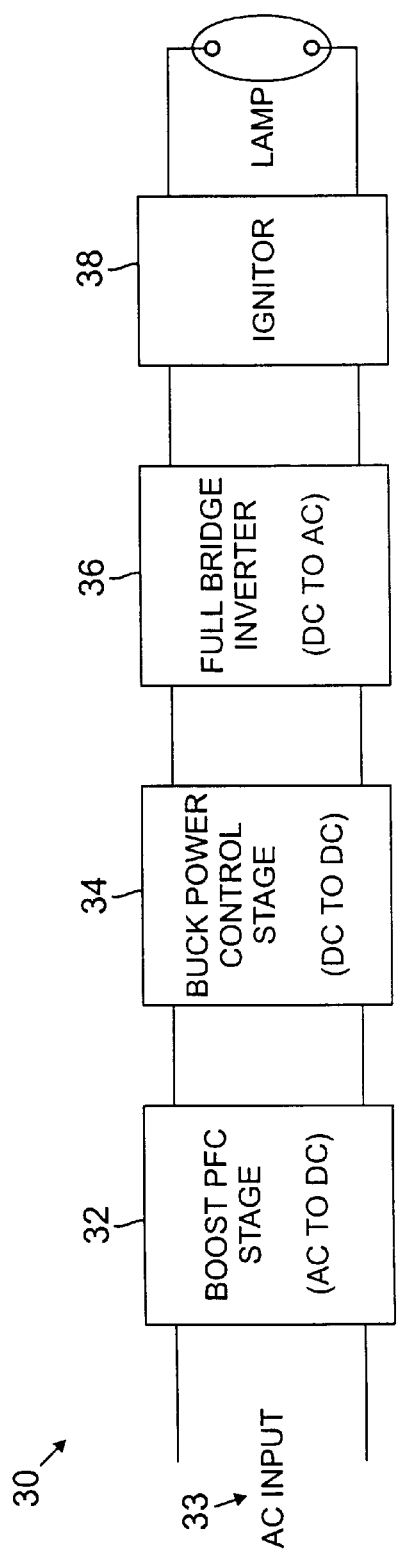
Figure 3B:
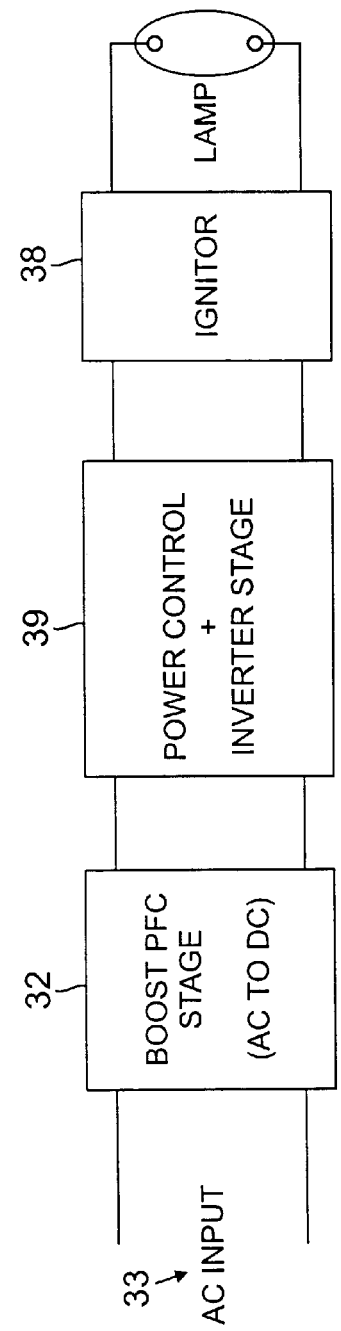
FIG. 3(b) shows the block schematic for a two stage ballast in which the power control and inversion stages are combined into one.
Figure 4A:
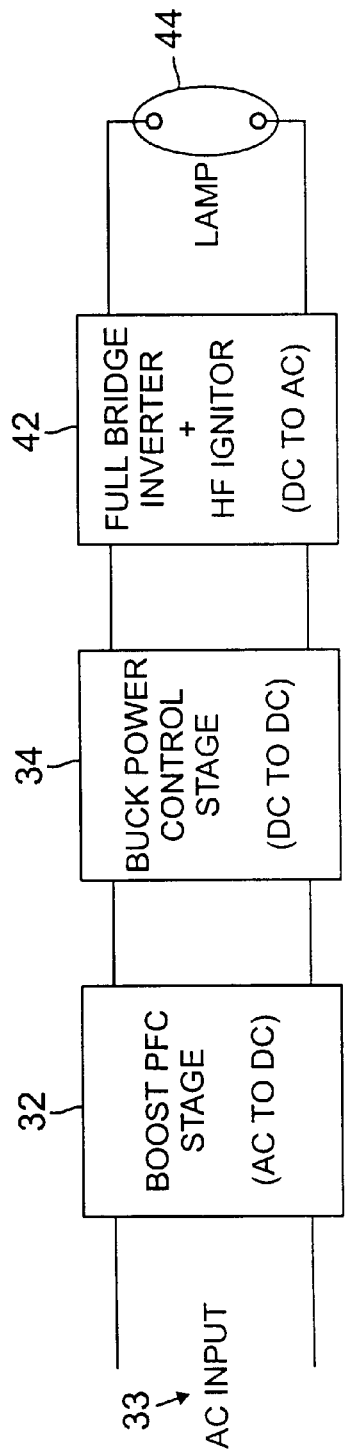
FIG. 4(a) shows the block schematic for the proposed electronic ballast for the HID lamp and FIG. 4(b) shows a more general embodiment of the proposed circuit.
Figure 4B:
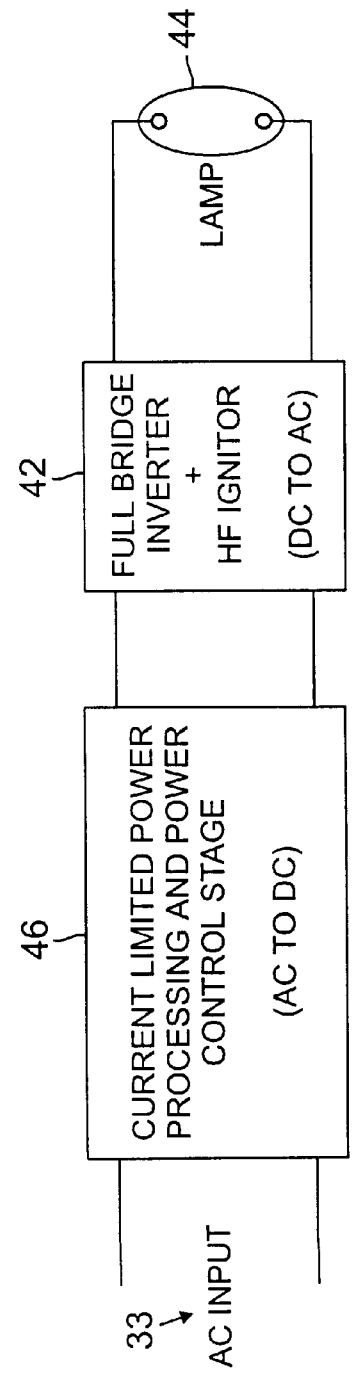

In the invention, a full-bridge inverter circuit and high frequency ignitor 42 (in FIGS. 4A and 4B) provide the HID lamp 44 with low-frequency current to avoid acoustic resonance and a preceding power control stage 32, 34 or 44 to limit lamp power and current. The lamp is never operated at high frequency and hence there is no chance of acoustic resonance. The circuit utilizes a resonant tank formed by a series connection of an inductor and a capacitor. The circuit is operated at high-frequency close to the resonant frequency of the tank. During the high-frequency mode the operation of the switching devices is controlled in a manner such that the full-bridge configuration is essentially converted to a half-bridge configuration and the lamp gets connected across the capacitor of the resonant tank. This switching control scheme requires only two switches to operate at high-frequency, thus reducing the number of high-frequency switches required. It must be noted that even though the circuit operates at high-frequency during starting, the lamp current, once the lamp arcs, is DC because of the circuit configuration and not high-frequency AC. Once the arc is established the lamp is operated by low-frequency AC. In this circuit configuration, the inductor and the capacitor values can be selected so that the circulating currents during the high-frequency operation are minimized and at the same time the lamp current, as soon as the lamp arcs, can be controlled at any desired value by the preceding power control stage. In this configuration the stress on the parts is significantly reduced.

FIG. 7(a) shows an example of a circuit schematic of the present invention. In FIG. 7(a) Lr is the resonant inductor 50, Cr the resonant capacitors 52, and Q1, Q2, Q3, and Q4 are switching devices with internal or external anti-parallel diodes 54, 56, 58, 60. The four switches are connected to form a full-bridge circuit. Lr and Cr form a series-resonant tank.

The DC bus 55 ($V_{dc}$) must be current limited since the lamp current must be limited and the inverter stage provides no control over the current. The bridge itself can be protected from over-current and over-voltage during the high-frequency operation by proper design of Lr (Q of the circuit) and by proper frequency control. Nevertheless, having a current limited DC bus provides additional protection for the bridge components during high-frequency modes and during output short circuit conditions. In most HID ballasts a preceding buck regulator stage or a combined power factor control (PFC) and power control stage provides this function.

During normal lamp operation, the bridge operates as a full-bridge, i.e., Q1 and Q4 conduct simultaneously during one-half cycle while Q2 and Q3 conduct simultaneously during the other half cycle, thus applying a low-frequency bipolar rectangular voltage across the lamp. The amplitude of $V_{dc}$ at any instant is function of the lamp voltage and is controlled by the power control stage (not shown). Lr serves as a filter for the high-frequency component of lamp current which arises due to high-frequency ripple on the DC bus voltage (i.e., the output of buck converter/power control stage). The resonant frequency of the tank is several orders of magnitude higher than the normal operating frequency, i.e., the value of Cr is very small and, thus, it does not affect the normal operation of the circuit in any significant way.

What happens during starting is different from the normal operating mode and from operation of known circuits. FIG. 8 shows exaggerated gate drive waveforms during starting and during normal operation. Q1 and Q2 (or Q3 and Q4) never conduct simultaneously because, if they do, they will short $V_{dc}$. It will also be noticed that Q4 is ON continuously and Q3 is OFF continuously during the start-up high-frequency mode, while Q1 and Q2 switch at high-frequency. This mode of operation essentially converts the full-bridge to a half-bridge. There are several important features of this half-bridge operation as compared to operating the resonant circuit as a full-bridge. First, only two transistors, Q1 and Q2, operate at high-frequency and, thus, only one high-frequency driver is required (high-frequency high-side drivers cost significantly more than low-frequency drivers). A high-frequency driver is not required for Q3 and Q4. Also, slower transistors can be used for Q3 and Q4 if so desired (slower transistors are normally cheaper). Second, the driver for Q3 and Q4, which operates at low frequency, is simplified and the cost can be reduced considerably. Third, Cr can be placed as shown in FIG. 7 instead of across the lamp. This eliminates the need for Q4 to carry the high circulating currents during the high-frequency operation. This is not possible in a full-bridge operation shown in FIG. 6. As shown in FIG. 7(a), Cr can be placed on a tap of Lr winding. This provides a voltage boost across the lamp while keeping the voltage across Cr the same. Up to 400V can be easily added to the peak of the output voltage by few extra turns on Lr. It must be noted that this construction of Lr is not a requirement for proper circuit operation and FIG. 7(b) shows a circuit implementation where Cr is connected directly to one end of Lr. One of the main differences between the full-bridge and half-bridge starting is the current through the lamp after ignition while the circuit is still in high-frequency mode. In the full-bridge operation this current is AC with no DC off-set and, as mentioned earlier, its value is largely determined and limited by the value of Lr and the DC bus. In the half-bridge operation of the circuit shown in FIG. 7, the lamp current is DC with a high-frequency ripple component superimposed on it. The DC value of current is determined by the current limit of the preceding power control stage, while the ac ripple is determined by the value of Lr, the operating frequency and the DC bus voltage, and is small compared to the DC value. The current limit set by the preceding power stage is crucial both for the normal warm-up of lamp and for generating sufficient voltage to strike the arc. If this value is set too low, the circuit may not produce a high-enough voltage to strike the arc or the current may be too low to warm-up the lamp once it arcs. If this limit is set too high, it will degrade lamp life and it will cause additional stress on the circuit components under short-circuit conditions of output.

The AC nature of the current in full-bridge operation may be a disadvantage since its value is significantly lower (limited by Lr) when compared to the value of DC (limited by current limit of preceding buck stage) for half-bridge operation on the same circuit. The lower value of current will not heat the electrodes fast enough and will adversely affect the lamp life (this is like dimmed operation).

The advantage of high-frequency resonant ignition over the pulse ignitor is that the open-circuit voltage is no longer a critical factor. This is because the voltage across the lamp self adjusts forcing a quick and smooth transition from glow to arc. During the glow mode the lamp impedance is high and this causes the resonant tank to get unloaded increasing its Q which increases the voltage across the lamp. On the other hand, during the normal arc the lamp impedance is low and this causes the resonant tank's Q to lower reducing the voltage across the lamp.

Yet another advantage of the circuits shown in FIG. 7 over the pulse ignitor is that the stray cable capacitances are effectively placed across the resonant capacitor. This would affect the resonance frequency somewhat, but would not degrade the performance to an extent the performance of the pulse ignitor would be degraded.

As mentioned earlier, during starting, one leg of the bridge is operated at high-frequency while the other leg is operated so that it converts the full-bridge into a half-bridge (see FIGS. 7 and 8). To get maximum voltage gain, the frequency of operation is ideally the resonant frequency of the tank, $$f_r = \frac{1}{2\pi\sqrt{L_r C_r}}$$

This however is not possible in production, unless some sort of feedback is used, because of component tolerances.

For this reason, the frequency during the high-frequency operation is not kept constant, but is swept over a predetermined range 60 (FIG. 9) so that it will cross the resonance point 62 at some instant so a high peak voltage is applied across the lamp. Thereafter for the remainder of the high-frequency period the frequency is kept at a certain minimum value 64 to generate a certain minimum voltage. For example the nominal resonance frequency can be selected to be 50 kHz. The tolerances of Lr (±5%) and Cr (±5%) can easily cause ±5% variation in the resonant frequency. This would cause the resonance frequency of the tank to vary from 52.5 kHz to 47.5 kHz. To allow for tolerance of the frequency generator (±5%) the frequency sweep is started at 60 kHz. The sweep time 66 is in the order of 100 mSec. The idea is to catch the resonance peak as close as possible or sweep through it. The frequency at the end of the sweep is about 46 kHz (determined experimentally) and is maintained at that value for the remainder of the high-frequency period. FIG. 9 shows an exaggerated plot of switching frequency Fs versus time and the open-circuit output voltage versus time.

The exact values of the open-circuit voltage during high-frequency operation depends on the resonant frequency of the tank, the Q of the tank, and the final frequency value. The circuit must be designed to insure at least 1.2–1.5 kV for the final value of open-circuit voltage. The peak voltage value is a function of the saturation characteristic of the core, core and copper loss in Lr (Q of the tank), and to a degree the amount of current available from the preceding buck stage, its regulation. A 2–2.25 kV of peak value is desirable.

The characteristic shown in FIG. 9 is determined through experimentation. It is found that having a higher value of voltage "V" at the end of the sweep, and having a longer period for time "T" is helpful in starting stubborn lamps. A high value of peak voltage is no good if the final value of voltage is too low. The optimum value of time T is found to be between 400–600 mS. Sufficient time must be allowed for the lamp to stabilize (go completely from glow to arc) before switching to low frequency operation. On the other hand, if too long a time is provided, the DC current flowing through the lamp may adversely affect lamp life. To minimize the circuit complexity the high-frequency operation is done in open loop, i.e., even if the lamp arcs the circuit continues to operate at high-frequency for a predetermined time and no effort is made to control the frequency to match the resonant frequency of the tank. The high-frequency mode of operation adds stress to the circuit components (Q1, Q2, Lr and Cr) if it continues for too long and it is thus another factor affecting the maximum value for T. Near resonance, the circulating currents are fairly high and Cr and Lr are subjected to high voltages at the same time. Also, for below resonance frequency operation, Q1 and Q2 experience hard switching (the circuit operates in this mode for most of the high-frequency period). Also, since the lamp may not turn on in the first attempt (because it is still warm from previous operation or is difficult to start due to age), the circuit must keep trying to start it for at least 20 minutes. Thus, the circuit must be operated in the high-frequency mode repetitively. The control circuit 68 (FIG. 7*a*) is designed so the ballast tries to start the lamp approximately every 1.5 seconds for the first 10–15 seconds from power-up, to quickly start the lamp. However, if the lamp fails to start in this time an attempt is made every 4–4.5 seconds thereafter for approximately the next 20 minutes. If the lamp does not turn on in 20 minutes the ballast shuts off and the power must be recycled before it will re-start.

FIG. 10(*a*) illustrates this sequence, while FIG. 10(*b*) shows the actual circuit voltage immediately after power-up. Implementation of control is very simple. The lamp ON/OFF condition is easily sensed by the DC bus voltage at the inverter input. When the lamp is OFF this voltage is high, typically 200–300V, while when the lamp is ON it is fairly low, 20V at lamp start-up and 80–115V under normal running condition. To allow for increase in lamp voltage due to aging, a lamp OFF condition may be established when the DC bus is greater than 150V. If the lamp is detected to be OFF, the control starts the high-frequency ignition cycle described above and, once lamp turns ON, the high-frequency cycling is stopped.

In all likelihood the lamp will start in the first 100–300 ms of the applied high-frequency starting voltage. Some lamps require lower voltage to start and may take even shorter time to start. FIG. 11(*a*) illustrates the lamp voltage and lamp current in this situation. FIG. 11(*b*) shows the actual lamp current and an expanded time scale plot of transition from high-frequency starting to low-frequency normal operation region.

What is claimed is:

1. A discharge lamp driving circuit comprising
   DC voltage input connections,
   lamp driving connections,
   bridge circuitry connected to the DC voltage input connections and to the lamp driving connections and including circuit elements which in one mode of operation deliver a higher frequency AC voltage to the lamp driving connections and in another mode of operation deliver a lower frequency AC voltage to the lamp driving connections, and
   control circuitry connected to control the bridge circuitry selectively as either
      a half-bridge to deliver the higher frequency AC voltage to the lamp driving connections during starting or
      a full-bridge to deliver only the lower frequency AC operating voltage to the lamp while the lamp is operating normally after starting.

2. A discharge lamp driving circuit comprising
   DC voltage input connections, lamp driving connections, bridge circuitry connected to the DC voltage input connections and to the lamp driving connections, and including a low frequency driver and a high frequency driver connected to drive the bridge circuitry so that in one mode of operation a higher frequency AC voltage is delivered to the lamp driving connections and in another mode of operation a lower frequency AC voltage is delivered to the lamp driving connections, and control circuitry connected to control the bridge circuitry to deliver the higher frequency AC voltage to the lamp driving connections during starting or only the lower frequency AC operating voltage to the lamp while the lamp is operating normally after starting.

3. The driving circuit of claim 1 or 2 in which the bridge circuitry includes four bidirectional conducting portions connected in a bridge configuration.

4. The driving circuit of claim 1 or 2 in which the bridge circuitry includes a resonant circuit having an inductor and a capacitor, the inductor being connected to one of the lamp driving connections.

5. The driving circuit of claim 4 in which the control circuitry is connected to sweep the frequency of the AC voltage during starting through a range that includes a resonant frequency of the resonant circuit.

6. The driving circuit of claim 4 in which the capacitor is also connected to the one of the lamp driving connections.

7. The driving circuit of claim 4 in which the capacitor is connected to a tap of a winding of the inductor.

8. The driving circuit of claim 4 in which the control circuitry is connected to drive the bridge circuitry at essentially a resonant frequency of the resonant circuit.

9. The driving circuit of claim 2 in which the bridge circuit includes four switches, the low frequency driver is connected to drive two of the switches, and the high frequency driver is connected to drive the other two of the switches.

10. The driving circuit of claim 9 in which the low frequency driver is connected to selectively drive the two switches at DC on or DC off.

11. The driving circuit of claim 10 in which the control circuitry is connected to drive one of the two switches at DC during starting.

12. The driving circuit of claim 2 in which the control circuitry is connected to the low frequency driver and to the high frequency driver.

13. The driving circuit of claim 12 further comprising a resonant circuit connected between the commonly connected ends of the two switches of the one pair and one of the lamp driving connections and in which the commonly connected ends of the two switches of the other pair are connected to the other one of the lamp driving connections.

14. The driving circuit of claim 1 or 2 in which the control circuitry is connected to control the bridge circuitry to operate in the starting mode only until the lamp is ignited.

15. The driving circuit of claim 14 in which the control circuitry is connected to control the bridge circuitry during starting to repeatedly and alternately stop operation of the bridge circuit and to continue operation in the starting mode.

16. The driving circuit of claim 14 in which the control circuit is connected to control the bridge circuitry to deliver essentially DC to the lamp immediately after starting.

17. A method of driving a discharge lamp comprising operating a bridge circuit as a half bridge to deliver a higher frequency AC voltage from bridge circuitry to the lamp during starting, and operating the bridge circuit as a full-bridge to deliver only lower frequency AC operating voltage from the bridge circuitry to the lamp during normal operation after starting.

18. The method of claim 17 further comprising sweeping the frequency of the AC voltage during starting through a range that includes a resonant frequency of a resonant circuit.

19. The method of claim 17 in which the bridge circuitry is driven at essentially a resonant frequency of the resonant circuit during starting.

20. The method of claim 17 in which the bridge circuitry is operated in the starting mode only until the lamp is ignited.

21. The method of claim 17 further comprising, during starting, repeatedly and alternately stopping operation of the bridge circuit and continuing operation in the starting mode.

22. The method of claim 17 further comprising delivering essentially DC to the lamp immediately after starting.

23. A discharge lamp driving circuit comprising

DC voltage input connections, lamp driving connections, and bridge circuitry connected to the DC voltage input connections and to the lamp driving connections and including circuit elements which in one mode of operation deliver a higher frequency AC voltage to the lamp driving connections and in another mode of operation deliver a lower frequency AC voltage to the lamp driving connections, the bridge circuitry including four unidirectional conducting portions connected in a bridge configuration, a low frequency driver, a high frequency driver connected to drive one-half of the bridge, a resonant circuit having an inductor and a capacitor, the inductor being connected to one of the lamp driving connections, and control circuitry connected to control the bridge circuitry to deliver the higher frequency AC voltage to the lamp driving connections during starting and to deliver only the lower frequency AC operating voltage to the lamp while the lamp is operating normally after starting.

* * * * *